United States Patent

[11] 3,599,103

[72] Inventors Henri J. Nussbaumer
La Gaude;
Etienne E. Paris, Nice, both of, France

[21] Appl. No. 742,940
[22] Filed July 5, 1968
[45] Patented Aug. 10, 1971
[73] Assignee International Business Machines Corporation
Armonk, N.Y.
[32] Priority Nov. 8, 1967
[33] France
[31] 8819(AM)

[54] SYNCHRONIZER FOR DATA TRANSMISSION SYSTEM
4 Claims, 13 Drawing Figs.

[52] U.S. Cl. .................... 328/135, 178/69.5, 307/232, 328/63, 328/72, 328/110
[51] Int. Cl. .................... H03k 5/18
[50] Field of Search .................... 307/232, 269; 328/110, 119, 133, 149, 63, 72, 73, 74, 135; 178/69.5; 179/15

[56] References Cited
UNITED STATES PATENTS

| | | | |
|---|---|---|---|
| 3,102,164 | 8/1963 | Roiz | 178/69.5 |
| 3,116,458 | 12/1963 | Margopoulos | 328/135 |
| 3,130,371 | 4/1964 | Copeland | 328/135 X |
| 2,953,694 | 9/1960 | Wilson | 307/269 X |
| 2,952,811 | 9/1960 | Carr | 328/149 |
| 2,976,516 | 3/1961 | Taber | 340/164 |
| 3,051,928 | 8/1962 | Sullivan | 328/119 |
| 3,386,036 | 5/1968 | Gerrand et al | 328/110 X |
| 3,479,603 | 11/1969 | Overstreet Jr. | 307/269 X |

*Primary Examiner*—Donald D. Forrer
*Assistant Examiner*—R. C. Woodbridge
*Attorneys*—Hanifin and Clark and Delbert C. Thomas

ABSTRACT: In a transmission system using a signal-phase shift to encode data, the clock for sampling of the signal for data recovery is maintained in phase with the transmitter clock by a detector which indicates the signal positions having the same voltage magnitudes at positions 90° apart in the signal cycle. The sampling clock is controlled to sample the signal at the indicated points thereby enabling other devices to translate the transmitted data.

SYNCHRONIZER FOR DATA TRANSMISSION SYSTEM

INTRODUCTION

The invention concerns the decoding of a received message and, in particular, the recovery of clock control signals to enable correct phasing of the clock, with respect to the received signal.

This problem is particularly important in the systems where the message comprises some information zones and some nonsignificant element zones, as for example, in a four-phase transmission system. In such a system, four different phases may be transmitted for either four levels of a single quantity or to represent two data bits.

Various methods and means to obtain such clock synchronism are well known in the art, but the known methods and means cannot easily satisfy the multitude of requirements imposed by transmission conditions. Some of the known synchronizers necessitate the sending of special signals, others make use of the message data with the consequent use of fairly complex circuits.

OBJECTS OF THE INVENTION

One object of this invention is to provide a device for phasing and stabilizing the receiver clock, using a unique information signal analysis and requiring only simple circuits.

Another object of the invention is to provide a clock circuit phase control device under continuous activation by a phase angle detection device.

Still another object of the invention is to provide for the determination of the characteristic instants of the data by effecting correlations between the magnitudes of the signal at a certain number of instants. Still other objects of the invention will become apparent from the following description and attached drawings.

The foregoing and other objects, features and advantages of the invention will be apparent from the following more particular description of preferred embodiments of the invention, as illustrated in the accompanying drawings.

DRAWINGS

PRINCIPLES OF THE INVENTION

Figures 1, 2, 12:
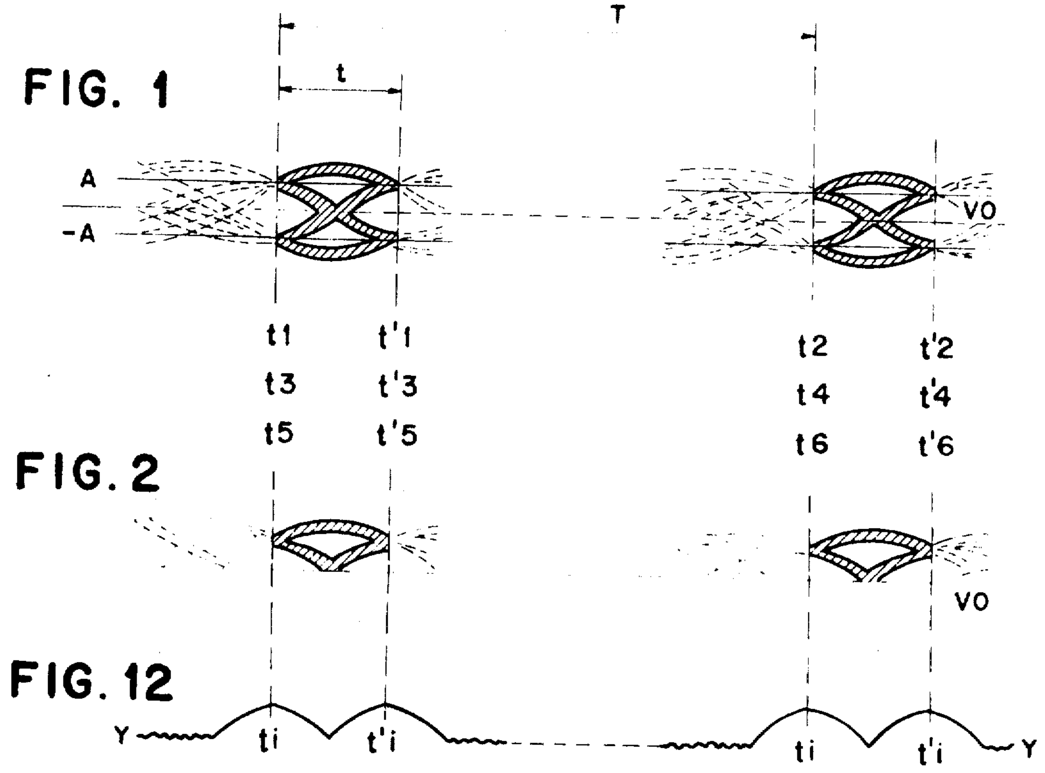
FIG. 1 represents the oscilloscope trace resulting from the superposition of a number of different four phase signals.
FIG. 2 represents the same superposition as FIG. 1 but with rectified signals.
FIG. 12 represents a signal generated from that of FIG. 2 by the device of FIG. 7.

In a four-phase data transmission system of the type indicated above, the received signal resulting from the data to be transmitted will assume one of the two levels A or −A, at certain instants $t1$, $t'1$, $t2$, $t'2$, corresponding to $\pi/4$, $3\pi/4$ etc. phase angles and will take everywhere else some other values which are nonsignificant for timing purposes. The clock must be kept synchronized so that sampling will occur at the instants $ti$, $t'i$ ($i$=1, 2,...). During the nonsampling interval from $t'1$ to $t2$, the signal phase may be altered to correspond to the next value of the data to be transmitted. The corresponding remanent image provided on an oscilloscope by the time superposition of various message phases gives an "eye" pattern as indicated in FIG. 1.

This image represents the signal configuration at instants $ti$ and $t'i$ and in their proximity, as well as at other instants. In absolute magnitudes, at $ti$ and $t'i$, the signal always assumes value A. A signal corresponding to the absolute magnitude can be obtained by rectifying the received signal, and will be as represented by the image shown in FIG. 2. It can also be seen that two instants $ti$ and $t'i$ are separated by $t$ (one-quarter of a cycle) and that a group $ti—t'i$ is separated from another group by a time interval T of one or more bit signal periods. If by using an appropriate device, the value of the signal at an instant I is compared to the value it had at an instant I−$t$, it will be seen that, if the absolute signal magnitudes are subtracted one from the other, the result of this operation will be a signal G, FIG. 13, which could be any value including null at various instants I, but will always be null at instants $t'i$.

If a pulse "$p$" is generated when signal G is null, the result will be a series of pulses, certain of which will appear at some undetermined instants, while others, $p'i$, will appear at each instant $t'1$. At a steady state of the system after the clock is synchronized, it can be maintained so by sending only the pulses $p'i$ to the clock, for example through electronic gates controlled by the clock itself.

Although the initial synchronization of the clock is not a part of this invention, it may be supposed that initial synchronization is attained by sending a special character or characters such that the comparison of the signal to the same signal, delayed by $t$, will produce a null resultant only at instants $t'i$. The sequences of pulses "$p$" will therefore be such, that all $p$ pulses will be at the $p'i$ time. They will thus all be sent to set the phase of the clock which will be then synchronized. Once this steady state is attained, it will then be possible to send any message for decoding.

DETAILED DESCRIPTION OF THE PREFERRED EMBODIMENTS

Figure 4:
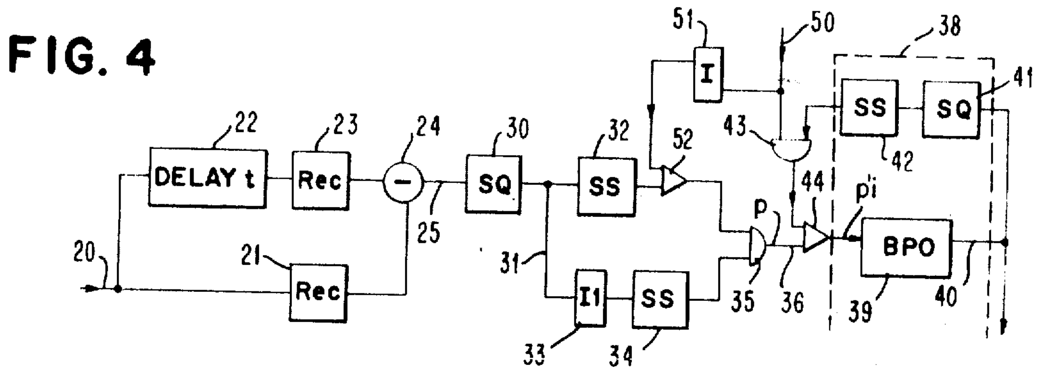
FIG. 4 represents a more elaborate device for generating the phase synchronization pulses.

Referring now to FIG. 4 there is shown one embodiment to be found in the receiver of the phase shift signaling system. The receiver includes a clock 38 means 20—25, 30—36 for synchronizing the phase relation between the clock signal output on path 40 and the received signal as shown in FIG. 1 applied to path 20. Further means 43, 50, 51 permit the clock and the synchronizer to be periodically initialized.

The synchronizer includes a comparison device 20—25, a pulse generator 30—35 responsive to the output of the comparator, and means 36, 41—44 for rephasing the clock to each pulse output from the generator.

Figure 3:
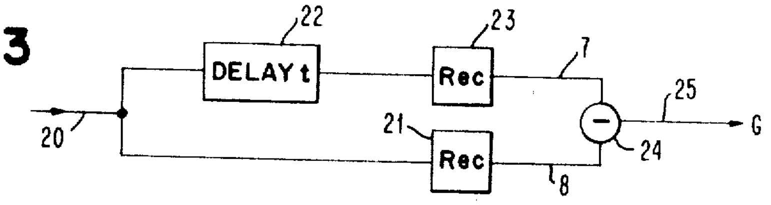
FIG. 3 represents a device for indicating the timing points for phase synchronization.
Figure 6:
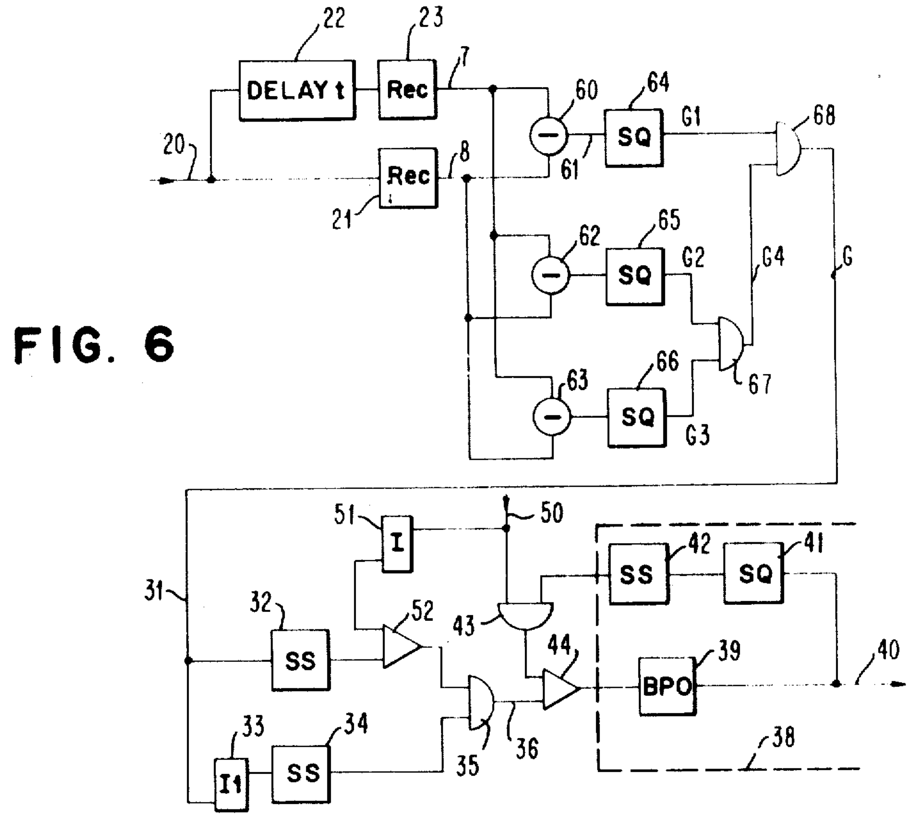
FIG. 6 represents a device for generating the phase synchronization pulses for the signal of FIG. 5.

Referring now to FIG. 3, there is shown a prototype of the comparator illustrated in FIGS. 4 and 6. Referring also to FIGS. 1 and 2, it is clear that in a phase shift signaling system the phase of a basic signal frequency is shifted by one or more 90° shifts. Furthermore, in the subsequent discussion it would be useful to recall that the time of occurrence of synchronization is the time when the absolute magnitude of an instantaneously received signal is equal to the absolute magnitude of a received signal delayed by a time interval equal to 90° of the basic signal frequency.

One embodiment for extracting synchronization information from an incoming phase modulated signal is shown in FIG. 3. The signal shown for example in FIG. 1 is applied on line 20 in FIG. 3. The absolute value of the instantaneous signal is obtained over path 8 through the rectification action of rectifying element 21. The absolute value of an instantaneous signal appears on path 7 through delay element 22 and rectifier 23. Rectifiers 21 and 23 are of the full wave type. A comparator 24 in the form of a subtracting circuit delivers a different signal on path 25. Accordingly, for the input signals of FIG. 1 applied to path 20, there would be a sine wave-shaped output signal G. This is shown, for example, in FIG. 13.

Referring again to FIG. 4, the output from comparator 24 is applied to the pulse generation means 30 to 35. The pulse generation means includes a pair of single-shot multivibrators 32 and 34, AND gate 52 and OR gate 35.

Figure 13:
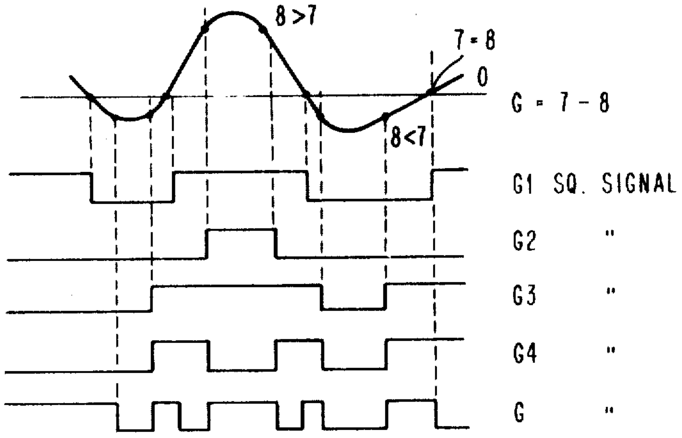
FIG. 13 represents some intermediate signal levels and pulses in the structure of FIG. 6.

Referring to FIG. 13, it is apparent that output G can vary through null in either a positive or negative-going manner. When G goes through the null in a positive-going manner it activates single-shot multivibrator 32. In this regard, single shot 34 is inhibited due to the action of inverter 33 on path 31. When signal G passes through the null in a negative-going manner it is inverted to positive by element 33 and applied to single shot 34. At this time single shot 32 is inactive. A pulse is therefore applied through OR gate 35 onto path 36 for each null transition of signal G. It should be noted that the output of singles shot 32 is applied to OR gate 35 through AND gate 52. AND gate 52 is normally on. This is ensured by the fact that inverter 51 continuously applies a DC level thereto.

As a consequence of the foregoing, a series of "p" pulses occurring at the frequency of the nulls of signal G is applied on path 36 to AND gate 44. It will be observed that the output of AND gate 44 drives clock 38. Also, the output 40 of clock 38 is synchronized with the "p" pulses through the feedback paths 41, 42, and 43, which path serves as a second input to AND gate 44.

The clock 38 comprises a blocked phase oscillator 39 and a feedback path as previously defined. The phase of oscillator 39 will be locked onto the phase of the signal gated through AND gate 44. This of course means that the phase will be locked onto the coincidence of the signal applied to path 36 with the signal output of oscillator 39.

The question arises as to the manner by which the system is initially put in synchronism or when it occasionally falls out of synchronism due to some unexpected characteristic of the transmission channel. Thus, when the system is in a starting phase, a DC bias is impressed on line 50 which through inverter 51 opens and gate 52. This blocks the output from single shot 32. Also, the DC level on line 50 opens AND gate 44. AND gate circuit 44 receives those pulses which are generated by single shot 34. This method initially provides phase synchronism between the clock and the negative-going null transitions of signal G on path 25.

Figure 5:
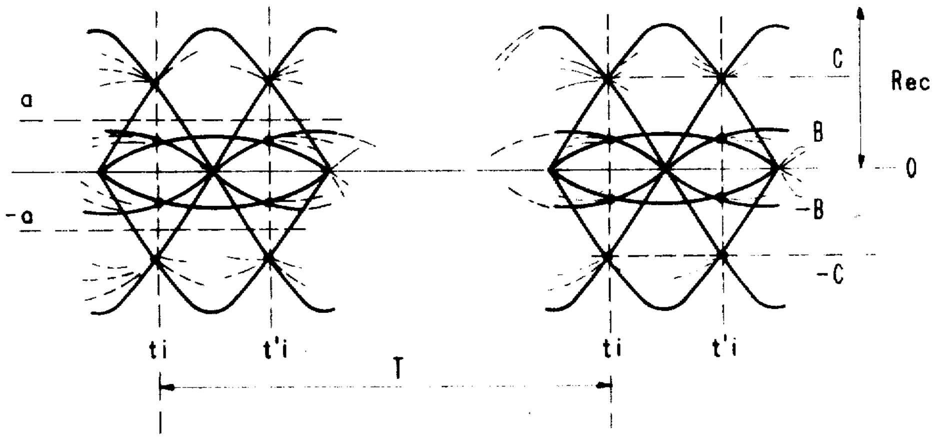
FIG. 5 represents an image similar to that of FIG. 1, but developed from a different signal having not only the four phases but also two levels of amplitude.

Referring now to FIG. 6 there is shown an embodiment which may be used for synchronizing a multiphase such as a four-phase two amplitude level signaling system. The four-phase two amplitude signals are shown in FIG. 5. The signals are no longer two level A and −A but are four level B, C, −B, −C. The structure of the embodiment shown in FIG. 6 will produce a series of pulses on line 36 corresponding to each of the null different transitions of the signals respectively appearing from comparators 60, 62, and 63. Referring now again to FIG. 5, at instants *ti* and *t'i*, the signal has an absolute magnitude of either B or C. After passage through the delay line 22 and rectifiers 21, 23 of FIG. 3, the subtractor 24 will at instants *t'i*, be required to compare two signals of a magnitude of either B or C. IN the structure of FIG. 6, if both signals have a magnitude of B or magnitude of C, a subtractor 60, similar to subtractor 24 of FIG. 3, will deliver at its output 61 a signal G1, see FIG. 13, which is null at the instant *t'I*. If one of the signals has a magnitude of B, and the other has a magnitude of C, one or the other of two weighted subtractors 62 or 63 will deliver at this time, a null signal G2 or G3. Subtractor 62 is for the case where the delayed signal is greater than the direct one, while subtractor 63 is for the reverse case. The desired signal G is the one which, among signals G1, G2, G3, is null. A gate selection device, similar to that described for FIG. 4, is provided for this signal. Each signal G1, G2, and G3 is squared in its squaring unit 64, 65, or 66 and signals G2 and G3 are supplied to an exclusive OR circuit 67 whose output signal G4 is supplied to a second exclusive OR circuit 68 B and 8=C signal G1. The output of exclusive OR 68 is the wanted signal G.

FIG. 13 indicates a signal G1 which is up when the signal at line 7 is less that the signal at line 8 of FIG. 6 and is down when the signal of line 7 is greater that that of line 8. Signals G2 and G3 corresponding to cases where 7=C and 8=B, and where 7=B. The device shown in FIG. 6 can be expanded to detect similar data transitions in data having another number of levels.

As was mentioned with respect to the device of FIG. 4, the device of FIG. 6 can maintain the setting of the clock but need an initial synchronizing procedure and a complete reestablishment of the process in case of loss of synchronization during the operation. The structure in the lower half of FIG. 6 is a duplicate of the synchronizing structure of FIG. 4 and is given the same reference numerals. As the operation of this structure has been previously described, it will not be repeated here.

It is also possible to determine the synchronization times by other devices which allow the selection of pulses *p'i* by determining in the message itself, the zones where instants *ti* and *t'i* are located.

Indeed, in such zones and in the vicinity of instants *ti* and *t'i*, the message presents some particular characteristics such as, for example, that the signal will not take certain determined critical values while, outside of such zones, there will always be, during a fairly larger period of time, an interval when the message will take one of these values.

It can thus be seen from the previous examples that, in the vicinity of *ti* or *t'i*, the message never takes values such as *a* O, or −*a* as indicated on FIG. 5, nor a value O as on FIG. 1. If the absolute values only are processed, the critical values are brought to values *a* and O. The devices needed to make use of such properties can be of various kinds. They will be more or less complex according to the coding used and the type of transmitted data. However, in the case where the information zones are periodically distributed, such devices can be simpler.

Figure 7:
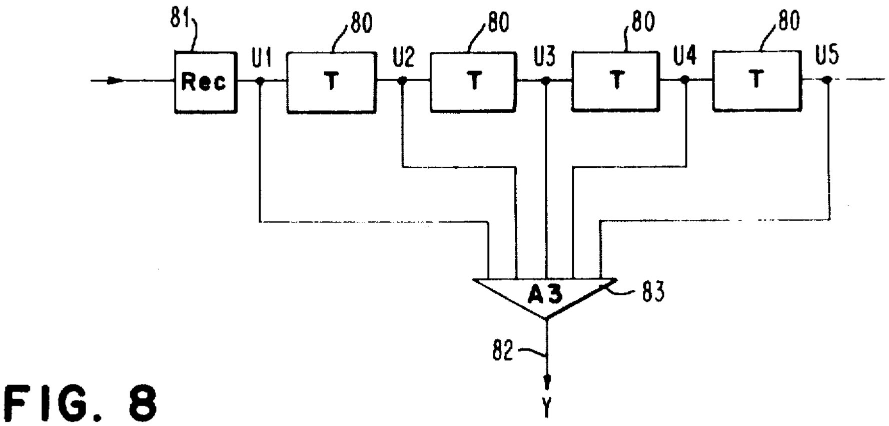
FIG. 7 represents a self-synchronizing device according to the invention.

For example, if the message enters a succession of delay lines 80 as in FIG. 7, each delay line 80 having a delay T and the total delay being *n*T, at an instant *t* not in one information zone, the received signal will have a certain value and simultaneously if *n*T (therefore the number of delay times T) is large enough, there will always be one of these delay lines 80 which will deliver a critical value signal. At an instant *ti* or *t'i*, or in their vicinity, none of these delay lines 80 will deliver one of the critical value signals. Thus there is provided a discriminating means which determines time windows where instants *ti* and/or *t'i*, are located.

Figure 8:
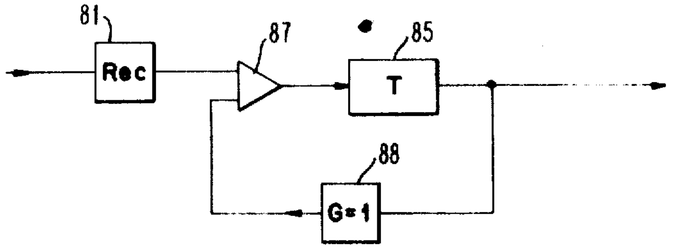
FIG. 8 represents another form of the device shown in FIG. 7.

In the case of a signal with two significant values A and −A, the critical value is nearly 0. Such a device working on the absolute value, through full wave-rectifying circuit 81 is represented on FIG. 7. The time windows for synchronization are those where a signal Y, issued at the output 82 of AND circuit 83 is not close to zero. Signal Y is analogically represented in FIG. 12 because the inputs of AND 83 can either be analog or digital signals. An equivalent construction is given 91 FIG. 8, with a delay line 85 having a delay of T, a full wave-rectifier 81, AND circuit 87 and a feedback circuit 88 with a gain of unity and feeding back the output of delay line 85 to the input of AND 87. The rectified signal of rectifier 81 is recirculated in delay line 85, through amplifier 88 and AND circuit 87, and the correlation is spread over the full signal period. If the gain is slightly below one, the amplitude of the circulating signal tends towards O and the circuit must be periodically regenerated. Some corrections to the output of the circuit must be performed if the gain is higher than one.

Figure 9:
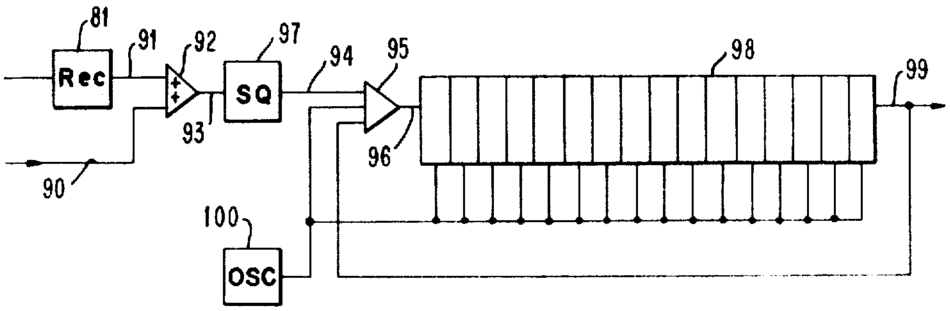
FIG. 9 represents yet another form of this same device.

An entirely digital realization of the synchronizing device is represented in FIG. 9. Threshold comparator 92 receives on line 91 the rectified signal whose sequence superpositions in time gives, as already seen, the representation of FIG. 2. Output 93 of comparator 92 will have a positive, or a negative signal according to whether the signal received on line 91 is above or below a selected threshold signal on a line 90. This signal on line 93 is squared up in squarer 97 whose output line is 94. It can be seen that this signal on line 94 is always "high" in the vicinity of instants *ti* and *t'i*, but may be either high or low at any instant *tj* situated in a nonsignificant zone. In such a zone, if the square signal on line 94 is high at an instant *tj*, it will not necessarily be so at an instant *tj*±T or *tj*±2T etc... and conversely. Consequently, the square signals issued from squarer 97 are sent to an AND circuit 95 which also receives the output 99 from a shift register 98 and the pulses from an oscillator 100 having a frequency which is a multiple *k* of the signal repetition rate. Oscillator 100 also controls shift register 98 which will have *k* positions. Taking into account what has already been mentioned, that an instant *tj* will always be available where a square signal received from squarer 97 will be different from the square signal of a previous instant *tj*—T, at the end of a few periods at each instant *tj*, we can have the signal high on line 94, but low at output 99 or inversely at other instants. In either situation, a digital zero will be introduced into shift register 98 on output line 96 from AND 95. During each repetition of time T the number of zeros within the register will increase in the positions occupied by the instants *tj* but at instants near to *ti* or *t'i*, the signal will be high on both lines 94 and 99 and a digital 1 will be recorded in shift register 98. After a certain number of register cycles, output 99 delivers synchronizing pulses only in time windows located in the vicinity of instants *ti*, *t'i*.

Figure 10:
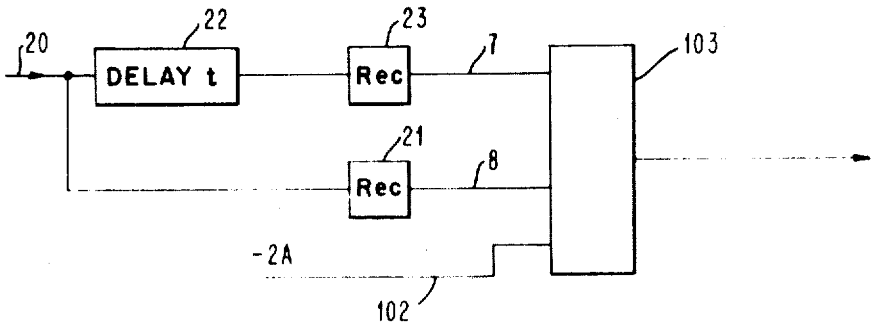
FIGS. 10 and 11 are two examples of additional devices similar to that of FIG. 3.

FIG. 10 shows a modification of the device of FIG. 3. In this device, the signals on lines 7 and 8 are added together and are compared to a value 2A on a line 102 by a comparator 103 which delivers a null signal when the sum of the signal from rectifier 21 at instant *ti* and of the signal from rectifier 23 at instant *t'i* has a value 2A.

Figure 11:
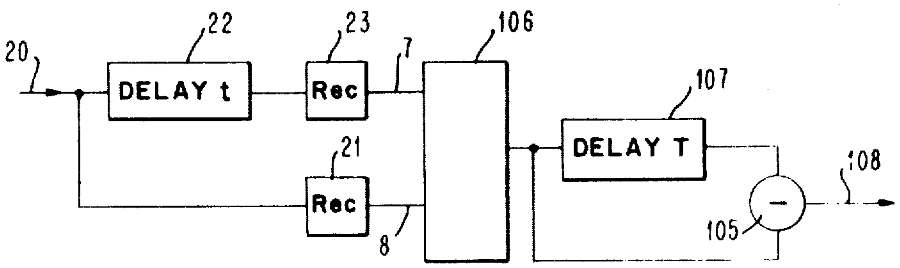

FIG. 11 represents another modification of the device of FIG. 3 wherein a comparison is made in subtractor 105 of the sum (obtained in adder 106) at one instant, of the signals on lines 7 and 8 with the same sum obtained at the same instant of the previous signal period. The previous sum is passed through a delay line 107 having a delay of T so that the output 108 of subtractor 105 is a four point correlation of the signal magnitudes.

While the invention has been particularly shown and described with reference to preferred embodiments thereof, it will be understood by those skilled in the art that the foregoing and other changes in form and details may be made therein without departing from the spirit and scope of the invention.

What I claim is:

1. In the receiver of a phase shift signaling system in which the phase of a basic signal frequency may be shifted by one or more 90° shifts for data transmission, the receiver including a clock (4—38, 6—38, 9—98, 99, 100); means for synchronizing the phase relation between the clock signal output (4—40; 6—40; 9—99) and the received signal; and means (50, 51, 43) for periodically initializing the clock and the synchronizing means; wherein:

the synchronizing means comprise:

comparison means (4—20 to 25; 6—20 to 23; 60 to 63) for generating a signal indicative of the difference between the absolute magnitude of the signal as received and the absolute magnitude of the signal as received after a time delay equal to 90° of the basic signal frequency;

means (4—30 to 35; 6—64 to 68; 9—93, 94, 97) for generating a pulse responsive to each null difference signal; and means (36, 41, to 42) for rephasing the clock to each pulse.

2. In the receiver (FIG. 6) of a phase shift signaling system having four selectable phases of signal with each phase being further selectable in either of two amplitudes (B, —B, C, —C in FIG. 5), each phase signal further being of a basic signal frequency and shiftable by one or more 90° shifts for data transmission, the receiver including a clock (38,) means for synchronizing the phase relation between the clock signal output (40) and the received signal; and means (50 to 52) for periodically initializing the clock and the synchronizing means; wherein:

the synchronizing means comprise:

means 21 for deriving the absolute magnitude of the signal as instantaneously received;

means (22, 23) for deriving the absolute magnitude of the signal as received after a time delay equal to 90° of the basic signal frequency;

first comparison means (60, 61, 64) for generating a signal upon the occurrence of a null difference between the instantaneously received and delayed signal absolute magnitudes;

second comparison means (62, 65) for generating a signal upon the occurrence of a preselected difference between the instantaneously received and delayed signal absolute magnitudes;

third comparison means (63, 66) for generating a signal upon the occurrence of the negative preselected difference between the instantaneously received and delayed signal absolute magnitudes;

means (31, to 35; 67, 68) for generating a pulse responsive to each of the comparison signals; and means (41 to 44) for rephasing the clock to each pulse.

3. The synchronizing means according to claim 2, wherein: the pulse-generating means further include:

a first exclusive OR circuit (67) combining the outputs from the second and third comparison means; and a second exclusive OR circuit 68 combining the outputs from the first comparison means and the first exclusive OR circuit.

4. In a receiver of a phase shift signaling system in which the phase of a basic signal frequency may be shifted by one or more 90° shifts for data transmission, the receiver includes a clock (38); means for synchronizing the phase relation between the clock signal output 40 and the received signal; and means (50, 51, 43) for periodically initializing the clock and the synchronizing means; wherein:

the synchronizing means comprise:

means (11—20 to 23, 106) for generating a signal indicative of the sum of the absolute magnitudes of the signal as received and the signal as received after a time delay equal to 90° of the basic signal frequency;

means (11—105, 107, 108) for generating a signal indicative of the difference between the sum signal and the sum signal delayed by a time interval equal to an integral multiple of 90° of the basic signal frequency;

means (30—35; 64—68) for generating a pulse responsive to each null difference signal; and means (36, 41 to 44) for rephasing the clock to each pulse.

PO-1050
(5/69)

UNITED STATES PATENT OFFICE
CERTIFICATE OF CORRECTION

Patent No. 3,599,103 Dated August 10, 1971

Inventor(s) Henri J. Nussbuamer and Etienne E. Paris

It is certified that error appears in the above-identified patent and that said Letters Patent are hereby corrected as shown below:

Claim 1, Column 6, line 4, delete "42" and insert in place thereof --43--.

Claim 2, Column 6, line 16, delete "21" and insert in place thereof --(21)--.

Claim 3, Column 6, line 40, delete "68" and insert in place thereof --(68)--.

Claim 4, Column 6, line 47, delete "40" and insert in place thereof --(40)--.

Signed and sealed this 8th day of February 1972.

(SEAL)
Attest:

EDWARD M.FLETCHER,JR.
Attesting Officer

ROBERT GOTTSCHALK
Commissioner of Patents